Figure 2:
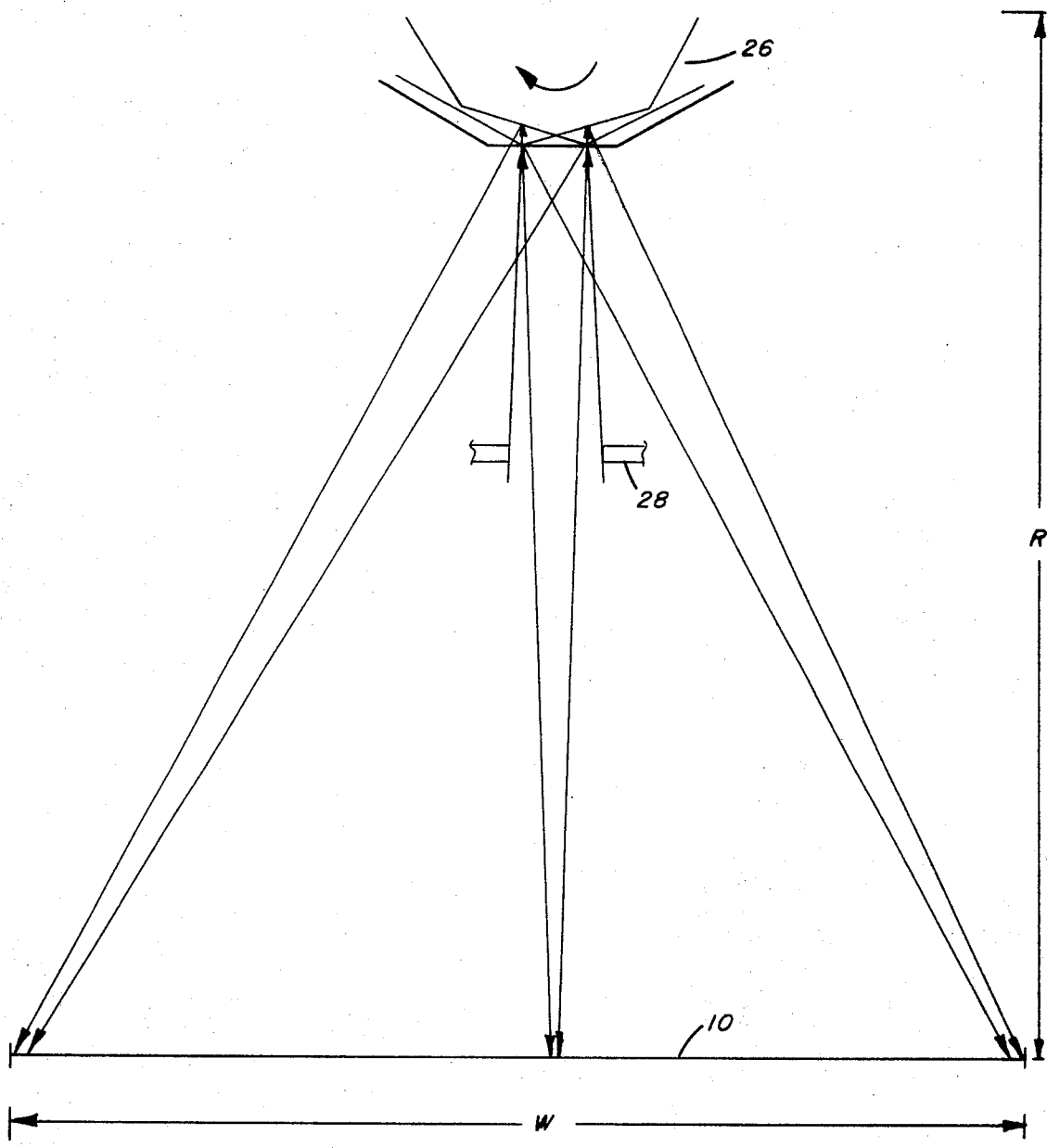

United States Patent

Blaisdell et al.

[15] 3,675,016
[45] July 4, 1972

[54] FLYING SPOT SCANNING

[72] Inventors: William H. Blaisdell, Rochester; Edward C. Cornelius, Fairport, both of N.Y.

[73] Assignee: Eastman Kodak Company, Rochester, N.Y.

[22] Filed: Feb. 17, 1970

[21] Appl. No.: 12,083

[52] U.S. Cl.............250/83.3 H, 250/219 WE, 250/219 DF, 250/236
[51] Int. Cl........................................................H01j 39/00
[58] Field of Search............250/217 CR, 202, 83.3 R, 216 R, 250/271 R, 219 QA, 219 FR, 219 WE, 219 DF, 219 S, 219 L, 219 DQ, 220, 221, 222, 223, 236; 178/7.6, 7.1; 331/94.5; 95/65; 355/125; 350/7, 99, 285, 206

[56] References Cited

UNITED STATES PATENTS

| 3,017,512 | 1/1962 | Wolbert | 250/83.3 D |
|---|---|---|---|
| 3,451,756 | 6/1969 | Young | 356/237 |
| 3,465,347 | 9/1969 | Hudson | 331/94.5 |
| 3,360,659 | 12/1967 | Young | 250/236 |
| 3,515,488 | 6/1970 | Houser | 250/219 DF |
| 3,469,030 | 9/1969 | Priebe | 250/236 |
| 2,254,624 | 9/1941 | Rinia | 178/7.6 |
| 3,517,202 | 6/1970 | Kennedy | 250/219 D |

OTHER PUBLICATIONS

Some Demonstrations in Optics Using a Gas Laser by Dutton et al. Am. J. Phy. 35(355), 1964

Primary Examiner—James W. Lawrence
Assistant Examiner—D. C. Nelms
Attorney—Walter O. Hodsdon and Robert F. Cody

[57] ABSTRACT

A flying spot scanner system is disclosed which obviates the prior art use of a large expensive lens by reflecting focused light off a multifaceted mirror to the element being scanned. The spot is made invariant and as small in size as possible by defining the dimensions of the focused beam so that only part, preferably half, of a mirror facet is illuminated during scanning; and by locating the mirror as close to the element being scanned as will allow the spot to be formed of all of the light beamed at the mirror. The source of illumination is a laser; and uniform spot intensity during scanning is assured by a suitably dimensioned stop.

1 Claim, 4 Drawing Figures

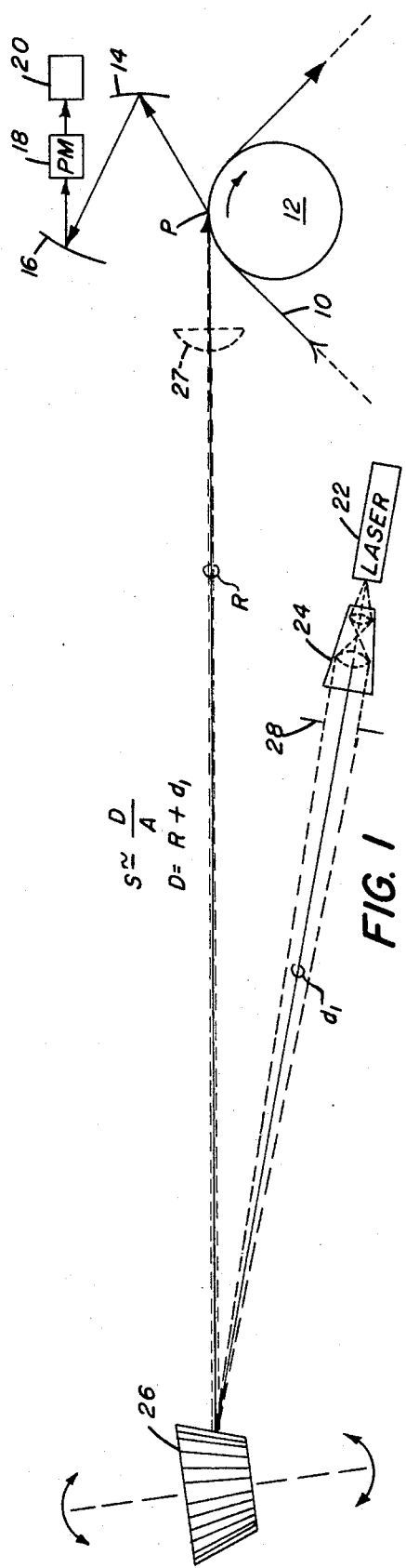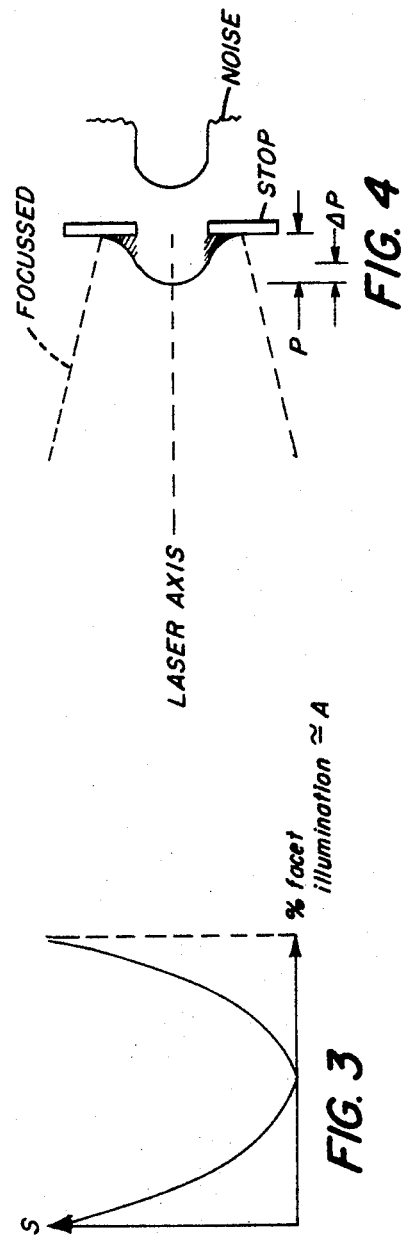

FLYING SPOT SCANNING

BACKGROUND OF THE INVENTION

1. Field of the Invention

This invention relates generally to optics; and in particular, the invention provides improved optics for purposes of flying spot scanning; and which optics especially serve to control spot size and spot intensity.

2. Description Relative to the Prior Art

Good resolution and response in a rotating mirror (multifaceted) flying spot scanner system obtain when the spot in question is small, of uniform size during scanning, and of an effectively constant intensity during such scanning.

Spot size (S) is governed (directly) by the distance (D) of the optical aperture of the scanner system to the element being scanned; and inversely in proportion to the size (A) of such aperture. If either the parameters D and A are subject to variations, so too will be the spot size.

The size of the aperture of a rotating mirror scanner system may be kept constant by either of two general techniques: (1) by directing light, at the mirror facets, in a beam wide enough to permit, say, several facets to be simultaneously illuminated; or (2) by directing light, at the mirror facets, in a beam that is sufficiently narrow to assure that less than a full mirror facet is the most than can ever be illuminated by the beam, and limiting scanning to that portion of the rotary travel of a facet when such facet is illuminated by all of such light beam. With both such general techniques, the system apertures in question are dimensionally invariant because the rotating facets have no influence on such apertures, i.e., they do not themselves become apertures, leaving definition of the size of the system aperture to the means which defines the widths of the beams.

Whereas the first of the above-indicated scanning techniques tends to be wasteful of the available optical energy, i.e., it dilutes such energy, the second of such scanning techniques is not; and it is to such second technique that the invention is especially, but not exclusively, directed:

U.S. Pat. No. 2,844,648 depicts a scanner system of the indicated second type, and presumably the scanner system of U.S. Pat. No. 2,844,648 will work well where the element (11) thereof to be scanned is small in width. The problem, however, is how to use a scanner system of the type disclosed in U.S. Pat. No. 2,844,648, say, to scan webs of 40 or 50 inches in width. Absent the invention, this would mean that the spot focusing lens (21) of U.S. Pat. 2,844,648 would have to be enormous in size; and for the requisite spot dimensions, such lens would have to be precision-made, and hence would be extremely costly. The term "focusing" as used herein means the reduction of one area illumination into a smaller area illumination.

As above noted, a scanner system of the indicated second type is not wasteful of the available optical energy; and therefore readily lends itself to the rapid inspection of photosensitive webs by means of infrared light. As is known, the temporal response and sensitivity of available infrared detectors is less than would otherwise be desired; and it is because of this that the brilliant output of a laser, as presently preferred, is employed as the light source for spot generation.

The light output of a laser in a system of the indicated second type, as improved by the invention, however, presents still another problem, provided that the effective spot intensity is to be uniform (or reasonably so) during scanning. Such additional problem obtains because the output of a laser falls generally gaussianly in proportion to the radial distance from the optical axis of the laser. To image such a distribution of optical energy onto a partial mirror facet is to produce a light spot which is, undesirably, brightest at its center, and gradually fades in brightness towards its periphery.

SUMMARY OF THE INVENTION

To obviate the prior art requirement, for spot focusing purposes in a rotating mirror scanner system, of a (large, precision) lens proximate the (fairly wide) element to be scanned, the invention proposes to direct focused (i.e., convergent) light (as opposed to collimated light) through a suitably dimensioned stop, and which light is focused to a spot on the element to be scanned before passing through such stop, there being no need for focusing optics between the rotary mirror and the element being scanned.

More particularly, the invention proposes to define the dimensions of the stop in question so that the focused light that passes therethrough can illuminate only part of a given mirror facet (or parts of adjacent facets), for power conservation purposes, thereby to assure that the system aperture is the fixed aperture of the stop. Such a technique assures uniformity in the size of a sharply, but inexpensively produced, scanning spot. And to assure that the focused light spot is as small as possible, the rotating mirror is positioned as close to the element being scanned as is possible, while still permitting the full width of such element to be scanned; and the dimensions of the focused light beam is so set that approximately half the width of a mirror facet is illuminated by the beam.

Since, as above discussed, a laser—and in particular an infrared laser—is a preferred light source for use in rapidly scanning a photosensitive web, the invention further proposes that the laser output beam be so expanded dimensionally by a focusing lens system (i.e., a telescope), prior to the indicated stop, that only the central—fairly evenly powered—portion of the laser beam is allowed to be focused through the stop, thereby to assure that the focused spot has fairly constant power during scanning.

The invention will be further described in relation to the figures, of which

FIG. 1 is a schematic diagram illustrating a principal teaching of the invention, FIG. 2 is a diagram, illustrating in exaggeration, not only how focusing is effected, in a scanner system, without a lens proximate the element being scanned, but also illustrating the nonvariability of the effective aperture within such system, FIG. 3 is a diagram useful in describing the relationship between spot size and facet illumination in a scanner system as proposed by the invention, and FIG. 4 illustrates diagrammatically the manner of providing a flying spot, which spot has substantially even intensity across its dimensions, using a laser.

Referring now to FIG. 1, the invention is cast in the environment of a reflection scanner system: a web 10 moves over a rotatable drum 12; and a light spot sweeps across the width of the web 10. The light for producing the spot is beamed so as to strike the web surface, grazingly with respect to the periphery of the drum 12 (point P), thereby to be reflected off the web 10 to mirrors 14,16, and thence to a photodetector 18 for digestion by a using circuit or device 20. Discontinuities and irregularities in the surface of the web 10, at point P, cause modulation of the reflected light.

The light spot which sweeps widthwise across the surface of the web 10 is, in accordance with the invention, produced as follows: the output light beam of a laser 22 is expanded, and then focused to a spot on the web 10 by means of a telescope lens system 24. Such focused light beam is intercepted by a rotating multifaceted mirror 26 (mirror rotating means not shown), and is thereby caused to sweep across the surface of the web 10. To be noted is that a (large, expensive) focusing lens is not necessary between the rotating mirror 26 and the web point P—although a lens 27, indicated in phantom, may be employed to compensate for wobble, etc., of the rotary axis of the mirror, and which wobble would cause the focusing spot to move periodically in the direction of the web length.

As above discussed, if the web 10 is photosensitive, it is usually desired that inspection of such web be with infrared light. This means (especially if the mirror 26 is rotated at an extremely high rate of speed, as is required to maximize the amount of web surface area which is actually inspected) that an extremely high intensity spot be focused onto the web, for otherwise the photodetector 18, which in this case is an infrared detector, will be substantially unresponsive to light modulation by surface defects. Infrared detectors are notoriously low in temporal response and sensitivity. To economize on the available power for spot generation purposes, apparatus according to the invention purposely confines the focused light within a beam which is so dimensioned widthwise that only part of any given mirror facet (or parts of adjacent facets) can ever be illuminated at a given time. This means that all of the source light is, while the focused spot is on the web 10, assuredly directed at the web, and nowhere else.

FIG. 2 illustrates how a beam, focused to a spot on the web 10, produces a spot that has uniform dimensions during the transversal of the spot across the web: This means, assuming the mirror-to-web distance R is fixed, that the system aperture A is of a constant size, i.e., the mirror facets do not become apertures which gradually increase in size to a certain amount, and then gradually decrease in size. For a given amount of widthwise facet illumination, the width of the web 10 to be scanned determines the distance R that the mirror 26 must be for a spot which is of uniform size during scanning. However, the greater the amount of facet illumination, the farther the rotating mirror 26 must be from the web 10 to produce a spot which is of uniform size during scanning. As is above indicated, spot size depends, directly, on the size of the system aperture and, inversely, on the distance of such aperture from the web. FIG. 3 illustrates that if the facet illumination is small (i.e., small system aperture)—thereby allowing the mirror-to-web distance R to be small—the spot size will be large because the system aperture will be controlling of spot size. Similarly, if the facet illumination is large (large system aperture), the mirror-to-web distance R will have to be great if a spot of uniform size is to be swept across the web 10; and because of such great distance, the spot size will, attendantly, be large. To effect a uniformly sized spot, which is also small in size, the invention indicates that the widthwise mirror facet illumination be (approximately) 50 percent, and that the mirror 26 be positioned as close to the web 10 as is necessary to assure that the mirror facets do not become varying apertures, which corrolarily vary spot size.

The fixed system aperture, which obtains during web scanning, is provided by means of a stop 28. The stop 28, in combination with the expanding telescope 24, serves to produce a spot of substantially uniform intensity across its dimensions: As is known, the power output of a laser falls gaussianly in relation to radial distance from the optical axis of the laser. Thus, with the stop 28 so dimensioned that its output can illuminate only about one-half of any given mirror facet, the telescope 24—while focusing the laser output to a spot on the web 10—so expands dimensionally such output that laser light which is radially well away from the optical axis of the laser gets blocked by the stop 28. See FIG. 4 which graphically indicates how spot intensity is kept constant during scanning by blocking off-axis laser light.

Summarizing the above, it may be said that the invention teaches:

1. that in a rotating mirror flying spot scanner system, expensive large focusing lenses can be obviated provided source light is focused to a spot on the element being scanned by means disposed on the source side of the rotating mirror,
2. that spot size may be made uniform by so focusing such light that only part of a mirror facet can ever be illuminated, and by so setting the mirror scanning distance that the spot is formed on the element being scanned only when all of the source light is reflected by the mirror to the element,
3. that spot size may be made as small as possible by so defining the widthwise dimensions of the focused beam that it can illuminate only one-half of a given mirror facet, and
4. that, with use of a laser in a scanner system, spot intensity may be made fairly uniform by suitable defining the dimensions of a stop, and by so expanding, and focusing, the output beam from the laser that fringe illumination is blocked by the stop.

The invention has been described in detail with particular reference to preferred embodiments thereof, but it will be understood that variations and modifications can be effected within the spirit and scope of the invention.

What is claimed is:
1. In a flying spot scanner system of the type having:
 a. a multifaceted mirror adapted for rotation about its rotary axis,
 b. an infrared laser source of light, and
 c. means for beaming said light at said mirror for reflection thereof to a photosensitive web being scanned,
the improvement wherein the said means for beaming said infrared light is adapted to focus said infrared light to a spot on the said element being scanned before said infrared light strikes the said mirror for reflection to the said photosensitive web, said system including means for so restricting the dimensions of the focusing beam striking the said mirror that only part of a mirror facet is illuminated during substantially all of the time that the said light is reflected to the element being scanned,
 the focused beam being so dimensioned that it illuminates approximately one-half a mirror facet during the time that such beam is wholly reflected from such facet, and
 the distance (D) of said mirror from said element being scanned being substantially as small as is necessary for the defined spot to be formed during scanning from substantially all of the infrared light beamed at the said mirror,
 a. photodetector means responsive to infrared radiation for detecting light from the said spot,
 b. lens means for expanding the dimensions of the output beam from said laser, and for focusing said beam via said mirror to a spot on the said photosensitive web being scanned, and
 c. means for providing an optical stop for blocking light from the said laser which is radially more than a predetermined distance off the optical axis of the said laser.

* * * * *